(12) United States Patent
Lin et al.

(10) Patent No.: US 11,948,243 B2
(45) Date of Patent: Apr. 2, 2024

(54) THREE-DIMENSIONAL VIRTUAL OBJECT INTERACTION METHOD AND APPARATUS, DISPLAY DEVICE, AND STORAGE MEDIUM

(71) Applicant: Tencent Technology (Shenzhen) Company Limited, Shenzhen (CN)

(72) Inventors: Mingtien Lin, Shenzhen (CN); Wenjie Wu, Shenzhen (CN); Jingzhou Chen, Shenzhen (CN); Weibiao Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 117 days.

(21) Appl. No.: 17/733,813

(22) Filed: Apr. 29, 2022

(65) Prior Publication Data

US 2022/0262064 A1    Aug. 18, 2022

Related U.S. Application Data

(63) Continuation of application No. PCT/CN2021/097660, filed on Jun. 1, 2021.

(30) Foreign Application Priority Data

Jul. 16, 2020 (CN) .......................... 202010683899.7

(51) Int. Cl.
    *G06T 15/20*    (2011.01)
    *G06F 3/01*     (2006.01)
    *G06T 15/00*    (2011.01)

(52) U.S. Cl.
    CPC ............. *G06T 15/20* (2013.01); *G06F 3/016* (2013.01); *G06F 3/017* (2013.01); *G06T 15/005* (2013.01)

(58) Field of Classification Search
    None
    See application file for complete search history.

(56) References Cited

U.S. PATENT DOCUMENTS

| | | | | |
|---|---|---|---|---|
| 6,252,720 B1 * | 6/2001 | Haseltine | ............... | H04N 5/445 348/E5.103 |
| 6,831,678 B1 * | 12/2004 | Travis | .................. | G03H 1/2294 348/57 |

(Continued)

FOREIGN PATENT DOCUMENTS

| | | |
|---|---|---|
| CN | 106919294 A | 7/2017 |
| CN | 106970709 A | 7/2017 |

(Continued)

OTHER PUBLICATIONS

Tencent Technology, ISR, PCT/CN2021/097660, Aug. 18, 2021, 2 pgs.

(Continued)

*Primary Examiner* — Jason A Pringle-Parker
(74) *Attorney, Agent, or Firm* — Morgan, Lewis & Bockius LLP

(57) ABSTRACT

This application discloses an interaction method performed by a display device and the display device. A three-dimensional virtual object may be obtained; an optical signal of the virtual object is transmitted to a first region of a space and then projected from the first region into a second region of the space through the display device, so that an image of the virtual object is generated in the second region of the space that is outside the display device; when it is detected that a user performs a motion sensing operation on the image of the virtual object in the second region of the space, the virtual object is updated based on the motion sensing operation, to obtain an updated virtual object; and an optical signal of the updated virtual object is then used for gener- (Continued)

ating an image of the updated virtual object in the second region of the space.

20 Claims, 5 Drawing Sheets

(56) References Cited

U.S. PATENT DOCUMENTS

| | | | | |
|---|---|---|---|---|
| 7,136,090 | B1* | 11/2006 | McDuffie White | H04N 7/144 348/E13.058 |
| 7,787,009 | B2* | 8/2010 | Alpaslan | H04N 13/317 348/51 |
| 9,529,424 | B2* | 12/2016 | Hilliges | G06F 3/012 |
| 9,658,596 | B2* | 5/2017 | Han | G06F 3/017 |
| 9,786,090 | B2* | 10/2017 | De La Riviere | G02B 30/35 |
| 10,275,098 | B1* | 4/2019 | Clements | G02B 30/56 |
| 2007/0132721 | A1* | 6/2007 | Glomski | G06F 3/04815 345/156 |
| 2013/0050409 | A1* | 2/2013 | Li | G03H 1/2294 977/932 |
| 2013/0314311 | A1* | 11/2013 | Kuhlman | G06F 3/005 353/7 |
| 2014/0355974 | A1* | 12/2014 | Low | G03B 17/17 396/331 |
| 2015/0077399 | A1 | 3/2015 | Nishioka | |
| 2015/0363070 | A1* | 12/2015 | Katz | G06F 3/04815 715/852 |
| 2017/0045740 | A1* | 2/2017 | Hirata | H04N 9/3164 |
| 2019/0091565 | A1* | 3/2019 | Nelson | G07F 17/3216 |
| 2019/0369740 | A1* | 12/2019 | Tokuchi | G06F 3/011 |
| 2020/0393156 | A1* | 12/2020 | Kim | G06F 3/017 |

FOREIGN PATENT DOCUMENTS

| | | |
|---|---|---|
| CN | 110471249 A | 11/2019 |
| CN | 111311986 A | 6/2020 |
| CN | 111312118 A | 6/2020 |
| CN | 111402885 A | 7/2020 |
| CN | 111722769 A | 9/2020 |
| WO | WO 2018094934 A1 | 5/2018 |

OTHER PUBLICATIONS

Tencent Technology, WO, PCT/CN2021/097660, Aug. 18, 2021, 5 pgs.

Tencent Technology, IPRP, PCT/CN2021/097660, Jan. 17, 2023, 6 pgs.

* cited by examiner

THREE-DIMENSIONAL VIRTUAL OBJECT INTERACTION METHOD AND APPARATUS, DISPLAY DEVICE, AND STORAGE MEDIUM

CROSS-REFERENCE TO RELATED APPLICATIONS

This application is a continuation application of PCT Patent Application No. PCT/CN2021/097660, entitled "INTERACTION METHOD AND APPARATUS, DISPLAY DEVICE, AND STORAGE MEDIUM" filed on Jun. 1, 2021, which claims priority to Chinese Patent Application No. 202010683899.7, filed with the State Intellectual Property Office of the People's Republic of China on Jul. 16, 2020, and entitled "INTERACTION METHOD AND APPARATUS, DISPLAY DEVICE, AND STORAGE MEDIUM", all of which are incorporated herein by reference in their entirety.

FIELD OF THE TECHNOLOGY

This application relates to the field of computers, and in particular, to an interaction method and apparatus, a display device, and a storage medium.

BACKGROUND OF THE DISCLOSURE

In recent years, with the development of three-dimensional imaging technologies, a three-dimensional imaging display and a three-dimensional imaging projector provide a new information output manner. Compared with conventional two-dimensional imaging, three-dimensional imaging has the advantages of rich details and conforming to the natural habits of human beings.

A current three-dimensional imaging technology is to project a three-dimensional virtual object on a transparent three-dimensional display screen for imaging, to achieve an effect in which the three-dimensional virtual object is suspended in the air.

However, at present, a method of interacting with a three-dimensional virtual object by using a method of operating a projection device or touching a three-dimensional display screen cannot meet requirements of a user. Therefore, a current interaction method of a three-dimensional virtual object is single.

SUMMARY

Embodiments of this application provide an interaction method and apparatus, a display device, and a storage medium, so that a user may perform motion sensing interaction with a 3D image projected in air.

An embodiment of this application provides an interaction method, performed by a display device, the method including:

obtaining a three-dimensional virtual object;

transmitting an optical signal of the three-dimensional virtual object to a first region of a three-dimensional space and projecting the optical signal of the three-dimensional virtual object from the first region into a second region of the space through the display device, so that a three-dimensional image of the three-dimensional virtual object is generated in the second region of the space that is outside the display device;

when it is detected that a user performs a motion sensing operation on the image of the three-dimensional virtual object in the second region of the space, updating the three-dimensional virtual object based on the motion sensing operation, to obtain an updated three-dimensional virtual object; and transmitting an optical signal of the updated three-dimensional virtual object to the first region of the space and projecting the optical signal of the updated three-dimensional virtual object from the first region into the second region of the space through the display device, so that an image of the updated three-dimensional virtual object is generated in the second region of the space.

An embodiment of this application further provides an interaction apparatus, including:

an obtaining unit, configured to obtain a three-dimensional virtual object;

a transmitting unit, configured to transmit an optical signal of the three-dimensional virtual object to a first region of a three-dimensional space and projecting the optical signal of the three-dimensional virtual object from the first region into a second region of the space through the display device, so that a three-dimensional image of the three-dimensional virtual object is generated in the second region of the space that is outside the display device;

A motion sensing unit, configured to update, when it is detected that a user performs a motion sensing operation on the image of the three-dimensional virtual object in the second region of the space, the three-dimensional virtual object based on the motion sensing operation, to obtain an updated three-dimensional virtual object; and an interaction unit, configured to an optical signal of the updated three-dimensional virtual object to the first region of the space and projecting the optical signal of the updated three-dimensional virtual object from the first region into the second region of the space through the display device, so that an image of the updated three-dimensional virtual object is generated in the second region of the space.

An embodiment of this application further provides a display device, including a display module, an optical panel, a motion sensing detection module, a memory, and a processor, the motion sensing detection module being configured to detect a motion sensing operation of a user;

the display module being configured to transmit an optical signal;

the optical panel being disposed at a junction between a first region and a second region of a space and being configured to negatively refract an optical signal of a three-dimensional virtual object transmitted to the first region of the space, so that an image of the three-dimensional virtual object is generated in the second region of the space by using the optical signal;

the memory being configured to store data of the three-dimensional virtual object and a plurality of instructions; and the processor being configured to read the plurality of instructions stored in the memory to perform the following operations:

obtaining the three-dimensional virtual object;

controlling the display module to transmit the optical signal of the three-dimensional virtual object to a first region of a three-dimensional space and projecting the optical signal of the three-dimensional virtual object from the first region into a second region of the space through the display device, so that a three-dimensional image of the three-dimensional virtual object is generated in the second region of the space that is outside the display device;

when it is detected that a user performs a motion sensing operation on the image of the three-dimensional virtual object in the second region of the space, updating the three-dimensional virtual object based on the motion sensing operation, to obtain an updated three-dimensional virtual object; and controlling the display module to transmit an optical signal of the updated three-dimensional virtual object to the first region of the space and projecting the optical signal of the updated three-dimensional virtual object from the first region into the second region of the space through the display device, so that an image of the updated three-dimensional virtual object is generated in the second region of the space.

An embodiment of this application further provides a non-transitory computer-readable storage medium, storing a plurality of instructions, the instructions, when executed by a processor of a display device, causing the display device to perform the operations of any interaction method according to the embodiments of this application.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The embodiments of this application provide an interaction method and apparatus, a display device, and a storage medium.

The interaction apparatus may be specifically integrated in an electronic device. The electronic device may be a device such as a projector, a display, or a terminal.

Figure 1A:
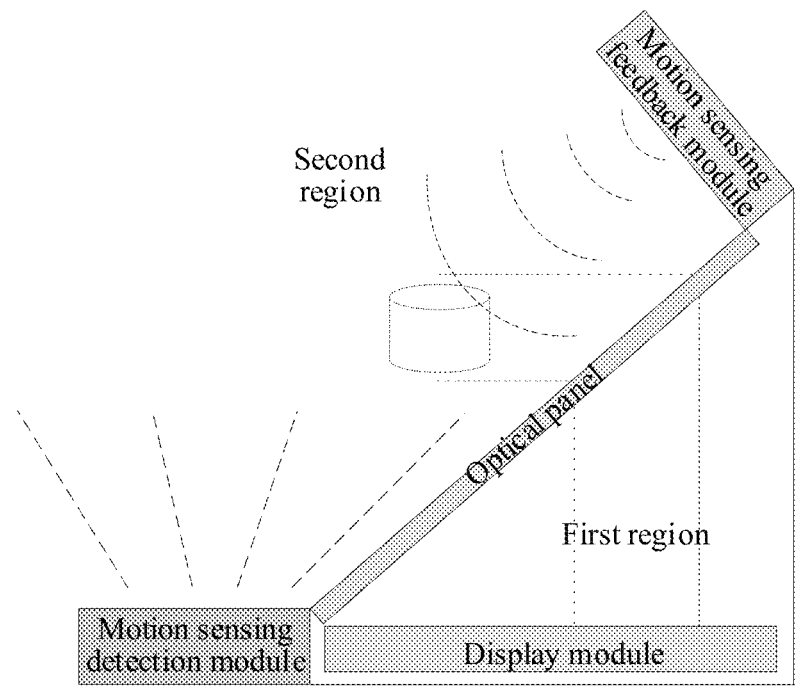
FIG. 1A is a schematic diagram of a scenario of an interaction method according to an embodiment of this application.

For example, referring to FIG. 1A, the electronic device may be a display device. The display device may include a display module, an optical panel, a motion sensing detection module, a memory, and a processor.

The motion sensing detection module is configured to detect a motion sensing operation of a user.

The display module is configured to transmit an optical signal.

The optical panel is disposed at a junction between a first region and a second region of a space and is configured to negatively refract an optical signal of a three-dimensional virtual object transmitted to the first region of the space, so that an image of the three-dimensional virtual object is generated in the second region of the space by using the optical signal.

The memory is configured to store data of the three-dimensional virtual object and a plurality of instructions.

The processor is configured to read the plurality of instructions stored in the memory to perform the following operations:

obtaining the three-dimensional virtual object;

controlling the display module to transmit the optical signal of the three-dimensional virtual object to the first region of the space, so that the imaging of the three-dimensional virtual object is generated in the second region of the space;

updating, when the motion sensing detection module detects that a user performs a motion sensing operation on the image of the three-dimensional virtual object in the second region of the space, the three-dimensional virtual object based on the motion sensing operation, to obtain an updated three-dimensional virtual object; and controlling the display module to transmit an optical signal of the updated three-dimensional virtual object to the first region of the space, so that an image of the updated three-dimensional virtual object is generated in the second region of the space, to implement interaction between the user and the three-dimensional virtual object.

Detailed descriptions are separately provided below. Sequence numbers of the following embodiments are not intended to limit preference orders of the embodiments.

In this embodiment, a method for interacting with a three-dimensional virtual object is provided. A three-dimensional virtual object may be displayed in the air by using the interaction method, and a user may interact with the three-dimensional virtual object in the air, to achieve a tactile feedback effect in which an object is truly presented in front of the user and the user can feel and touch the object.

Figure 1B:
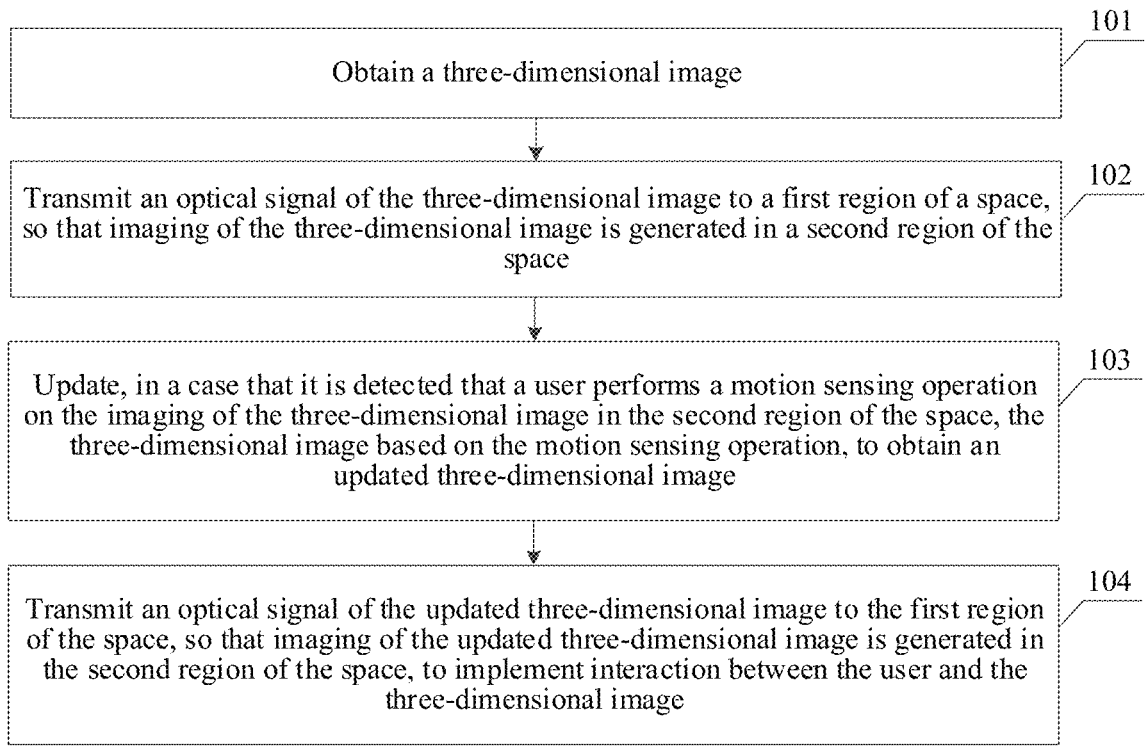
FIG. 1B is a schematic flowchart of an interaction method according to an embodiment of this application.

As shown in FIG. 1B, a specific process of the interaction method may be as follows.

101. Obtain a three-dimensional virtual object.

Because there is a specific eye distance between a left eye and a right eye of a person, in a real three-dimensional world, images seen by the left eye and the right eye of the person are not completely the same, and after imaging of two different images is generated in the eyes, a stereoscopic sense of space is generated in a human brain.

The three-dimensional virtual object may include a left image and a right image. When a left eye of a person receives the left image and a right eye receives the right image, a sense of space of the three-dimensional virtual object may be generate in a human brain.

The three-dimensional virtual object may be an image of a three-dimensional virtual character, an image of a three-dimensional virtual object, or the like.

There are a plurality of manners of obtaining the three-dimensional virtual object. For example, the three-dimensional virtual object is obtained from a server by using a network. In another example, the three-dimensional virtual object is determined by reading a three-dimensional model stored locally. In another example, a three-dimensional virtual object of an object in a real world is acquired by using a holographic technology.

102. Transmit an optical signal of the three-dimensional virtual object to a first region of a space, so that an image of the three-dimensional virtual object is generated in a second region of the space.

Figure 2A:
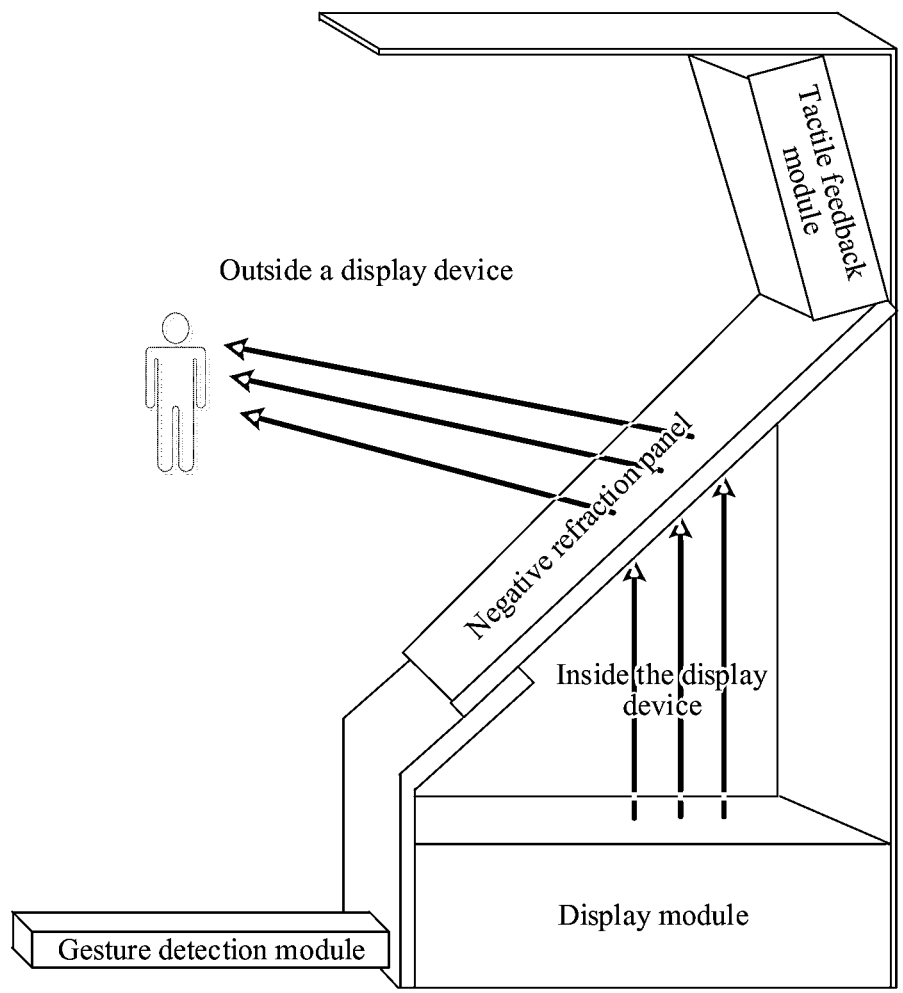
FIG. 2A is a schematic diagram of a mechanical structure of a display device according to an embodiment of this application.

It is assumed that the technical solution of this application is applicable to the game field. A display device shown in FIG. 2A is used as an example, and FIG. 2A is a schematic diagram of a mechanical structure of a display device. The display device includes a gesture detection module, a display module, a negative refraction panel, a tactile feedback module, and a housing of the display device. The housing may also be referred to as a structural member and is made of a hard or flexible material. This is not limited herein.

The first region of the space is located inside the display device, that is, formed by the negative refraction panel, the display module, and the structural member forming a closed space together with the negative refraction panel and the display module. The interference from an external light source may be reduced by using the closed space, to improve a display effect of an image. The second region of the space is located outside the display device, that is, an open or semi-open region outside the negative refraction panel. The region is open to a user side, so that the user may interact with a stereoscopically displayed image by using a body part such as a hand. The second region of the space is a sensing region located outside the display device. An optical panel may be disposed at a junction between the first region and the second region. The display module may be disposed in the first region, and the user may perform motion sensing interaction with the display device in the second region. In this embodiment, the optical panel is the negative refraction panel. The negative refraction panel is located at a junction of the inside and the outside of the display device and may divide the inside and the outside of the display device.

A relative position relationship between the display module and the negative refraction panel is not limited in FIG. 2A. During specific implementation, an inclination angle between the display module and the negative refraction panel is between 30° and 60°. Different inclination angles between the display module and the negative refraction panel causes different imaging positions of the three-dimensional virtual object generated in the second region of the space. The inclination angle between the display module and the negative refraction panel may be adjusted according to different use scenarios of the product.

When the display module transmits an optical signal of the three-dimensional virtual object to the first region of the space, the optical signal may penetrate through the optical panel, for example, the negative refraction panel, and is emitted to the second region, thereby achieving imaging outside the display device.

The display module may include a light-field display screen. For example, the light-field display screen may be formed by a plurality of projectors. Optical signals in different directions are projected to the second region outside the display device by using an array formed by the plurality of projectors, to implement projection of the three-dimensional virtual object.

After the display module transmits an optical signal of a game character to the negative refraction panel, the optical signal is refracted by the negative refraction panel, and with the negative refraction panel as a mirror surface, imaging may be performed at another position corresponding to an original imaging position inside the display device.

Due to an optical characteristic of the negative refraction panel, the refracted image is mirror-reverted. Therefore, in some embodiments, mirror flipping needs to be performed on a game character in advance, an optical signal of the mirror-flipped game character is refracted by using the negative refraction panel, and finally a correct three-dimensional virtual object of the game character is displayed in a sensing region.

The optical panel may be a panel structure made of a transparent or translucent material. The optical panel may be a plane panel or may be a curved panel, or the like.

In some embodiments, the optical panel is a negative refraction panel. The negative refraction panel is a transparent panel made of a negative refraction material. The negative refraction material has a negative refraction and is opposite to a conventional refraction. When a light wave is incident on an interface of a negative refraction material from a positive refraction material, an incident wave and a refracted wave are located at a same side in a normal direction of the interface.

After the optical signal is negatively refracted by using the negative refraction panel, light may be deflected in a direction opposite to an incident direction, so that an image of the three-dimensional virtual object displayed by the display module may be generated outside the display device, and the user can see the three-dimensional virtual object suspended in the air.

Figure 1C:
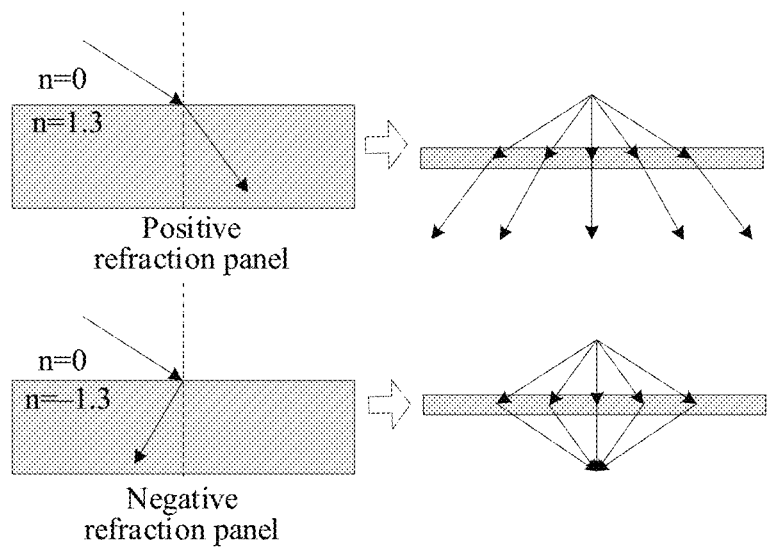
FIG. 1C is a schematic diagram of light negative refraction of an interaction method according to an embodiment of this application.

For example, an upper half part in FIG. 1C is a schematic diagram in which a light wave is incident on a glass panel with a refraction of 1.3 from the air. An incident wave and a refracted wave are located on opposite sides in a normal direction of an interface. Therefore, after an optical signal passes through a glass panel, imaging cannot be performed in the air behind the other side of the glass panel. A lower half part in FIG. 1C is a schematic diagram in which a light wave is incident on a negative refraction panel with a refraction of −1.3 from the air. An incident wave and a refracted wave are located at a same side in a normal direction of an interface. Therefore, after an optical signal passes through the negative refraction panel, imaging can be performed in the air behind the other side of the negative refraction panel.

In some embodiments, the optical panel may be a panel module formed by panels made of different materials. The panel module may include a negative refraction panel, a protecting glass, an optical auxiliary panel, and the like.

Therefore, due to the characteristics of the negative refraction panel, a mirror image of the original three-dimensional virtual object is displayed after the optical signal passes through the negative refraction panel. Therefore, to ensure the display accuracy of the three-dimensional virtual object, mirror flipping needs to be performed on the original three-dimensional virtual object in advance in step 102, so that after an optical signal of a mirror-flipped three-dimensional virtual object passes through the negative refraction panel, the original three-dimensional virtual object is displayed.

For example, in some embodiments, Step 102 may include the following steps.

(1) performing a mirror flipping operation on the three-dimensional virtual object, to obtain a flipped three-dimensional virtual object; and (2) generating an optical signal of the flipped three-dimensional virtual object, and transmitting the optical signal of the flipped three-dimensional virtual object to the first region of the space, an optical panel being disposed in the first region of the space, so that the three-dimensional virtual object is displayed in the second region of the space after the optical signal is negatively refracted by the optical panel.

Figure 1D:
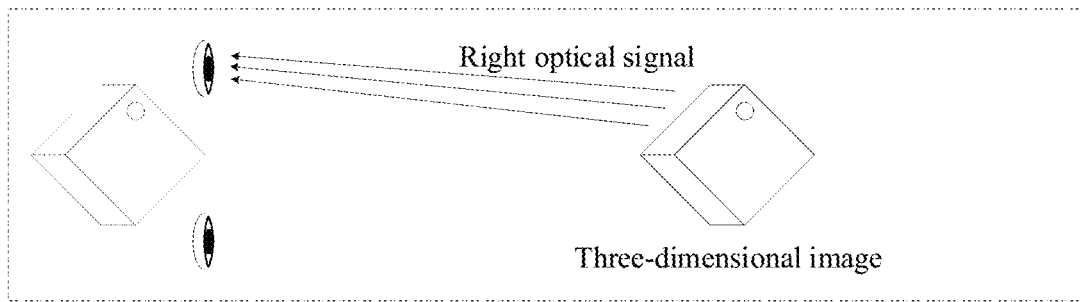
FIG. 1D is a schematic diagram of imaging of an interaction method according to an embodiment of this application.
Figure 1D:
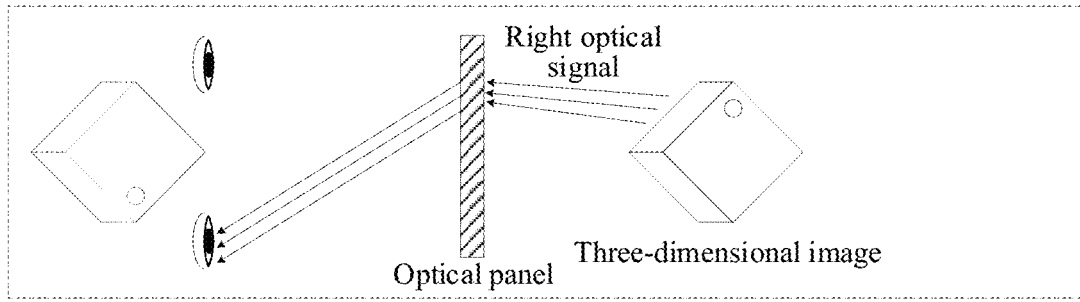
Figure 1D:
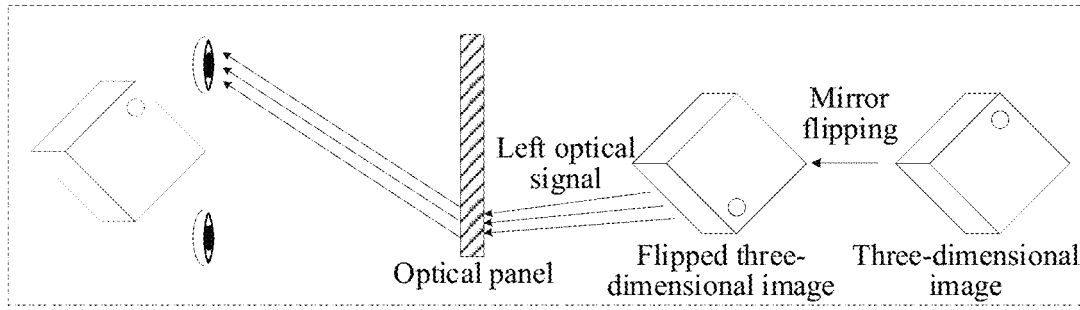

For example, referring to FIG. 1D, an upper part in FIG. 1D shows an effect of directly transmitting an optical signal of an original three-dimensional virtual object, and a user may directly see the original three-dimensional virtual object. A middle part in FIG. 1D shows an effect of transmitting an optical signal of an original three-dimensional virtual object to a negative refraction panel, and a user may see a mirror image of the original three-dimensional virtual object. A lower part in FIG. 1D shows an effect of first performing mirror flipping on an original three-dimensional virtual object and then transmitting an optical signal of a flipped three-dimensional virtual object to a negative refraction panel, and a user may see the original three-dimensional virtual object.

For example, referring to FIG. 1D, in some embodiments, because a three-dimensional virtual object is divided into a left image and a right image, an optical signal of the three-dimensional virtual object may be divided into a left optical signal and a right optical signal. Step (2) of generating an optical signal of the flipped three-dimensional virtual object and transmitting the optical signal of the flipped three-dimensional virtual object to the first region of the space may include the following steps:

generating the left optical signal and the right optical signal of the flipped three-dimensional virtual object; and transmitting the left optical signal and the right optical signal to the first region of the space, so that the left optical signal enters a right eye of a user after being negatively refracted by the optical panel and the right optical signal enters a left eye of the user after being negatively refracted by the optical panel.

103. Update, when it is detected that a user performs a motion sensing operation on the image of the three-dimensional virtual object in the second region of the space, the three-dimensional virtual object based on the motion sensing operation, to obtain an updated three-dimensional virtual object.

The motion sensing operation is an operation in which a person directly interacts with a display device by using a body action. Motion sensing, or referred to as somatosensory, may include a touch sense, a pressure sense, a sense of heat, a sense of pain, and the like. Different sensors may sense motion sensing of different types.

For example, the motion sensing operation may be used for capturing body movements of a human body by using a motion sensing sensor such as a camera, a handle, a foot strap, or an induction cap, to implement a human-machine interaction operation by using the body movements.

For example, when it is detected that a user "touches" a virtual three-dimensional character in a second region of a space, the virtual three-dimensional character may retreat.

In some embodiments, the motion sensing operation on the image of the three-dimensional virtual object performed by the user in the second region of the space may be detected by using the motion sensing detection module. Step 103 may include the following steps:

(1) determining an image coordinate set of the three-dimensional virtual object in a virtual coordinate system;

(2) generating, when the motion sensing operation of the user in the second region of the space is detected, a motion sensing coordinate set of the user in the virtual coordinate system based on the motion sensing operation;

(3) determining a touch status of the user for the imaging of the three-dimensional virtual object based on the motion sensing coordinate set of the user and the image coordinate set; and (4) updating the three-dimensional virtual object based on the touch status, to obtain the updated three-dimensional virtual object.

The virtual coordinate system is a preset three-dimensional coordinate system. The virtual coordinate system may be used for determining how the motion sensing operation of the user in reality acts on the three-dimensional virtual object in the virtual scene.

For example, it is assumed that an image coordinate set of a three-dimensional virtual object in the virtual coordinate system is P, $P=p(x_i, y_i, p(x_i, y_i, z_i)$ being image coordinates of each pixel of the three-dimensional virtual object in the virtual coordinate system, i being a positive integer greater than 0.

When a motion sensing operation of the user in the second region of the space is detected, a motion sensing coordinate set of the user may be generated in the virtual coordinate system based on the motion sensing operation. For example, when a gesture operation of the user in the second region of the space is detected, a motion sensing coordinate set H of a hand of the user in the virtual coordinate system may be determined, $H=h(x_j, y_j, z_j)$, $h(x_j, y_j, z_j)$ being image coordinates of each skeleton node of the hand of the user in the virtual coordinate system, j being a positive integer greater than 0.

When P intersects H, it may be determined that the hand of the user touches the three-dimensional virtual object. Therefore, it may be determined that a touch status of the user for imaging of the three-dimensional virtual object is [touch]. When P does not intersect H, it may be determined that the hand of the user does not touch the three-dimensional virtual object. Therefore, it may be determined that the touch status of the user for the imaging of the three-dimensional virtual object is [not touch].

When it is determined that the hand of the user touches the three-dimensional virtual object, step 103 of updating and displaying may be performed on the three-dimensional virtual object.

Specifically, in some embodiments, the motion sensing coordinate set may include a skeleton node coordinate set, and step (2) of generating, when the motion sensing operation of the user in the second region of the space is detected, a motion sensing coordinate set of the user in the virtual coordinate system based on the motion sensing operation may include the following steps:

obtaining a hand image of the user in the second region of the space;

performing skeletal analysis on the hand image, to determine skeleton nodes of a hand of the user; and determining coordinates of the skeleton nodes of the hand of the user in the virtual coordinate system, to obtain the skeleton node coordinate set.

For example, the motion sensing detection module may acquire images in the second region, and determine whether the images include a hand image of the user by performing image classification on the images.

Subsequently, the motion sensing detection module may recognize skeleton nodes of a hand of the user in the hand image, to determine coordinates of the skeleton nodes of the hand of the user in the virtual coordinate system.

The motion sensing detection module may acquire a depth image, a left image, a right image, and the like.

For example, the motion sensing detection module may include a left camera and a right camera. The motion sensing detection module may construct a depth image based on a left image and a right image acquired by the left camera and the right camera in the second region, and perform image semantic segmentation on the depth image by using a fully connected neural network, to obtain a hand depth image of the hand of the user from the depth image. Subsequently, each skeleton node of the hand of the user in the hand depth image is determined by performing image recognition on the hand depth image, to determine coordinates of the skeleton nodes of the hand of the user in the virtual coordinate system, thereby obtaining a motion sensing coordinate set of the user.

A gesture of the user, whether the hand of the user intersects with the three-dimensional virtual object in the virtual coordinate system, and the like may be determined by using the motion sensing coordinate set of the user, that is, coordinates of each skeleton node of the hand of the user in the virtual coordinate system.

In some embodiments, after the hand of the user enters the second region, the display device may correspondingly adjust an action of the virtual three-dimensional character according to a change of the hand of the user, to implement visual interaction.

In addition, in some embodiments, to give tactile perception to the user and further improve user experience, in some embodiments, step 103 may further include the following steps:

(1) determining motion sensing feedback information corresponding to the motion sensing operation; and (2) transmitting the motion sensing feedback information to the second region of the space, so that the user receives the motion sensing feedback information in the second region of the space.

Motion sensing feedback refers to giving somatosensory such a touch sense, a pressure sense, a sense of heat, a sense of heat, or the like to the user. For example, the motion sensing feedback may be classified as tactile feedback, force feedback, optical feedback, and the like according to types.

In this solution, motion sensing feedback information may be transmitted to the second region of the space by using the motion sensing feedback module.

The motion sensing feedback module may include a tactile feedback generator, a force feedback generator, an optical feedback generator, and the like.

For example, the tactile feedback generator may include an ultrasonic tactile feedback generator, an infrared tactile feedback generator, and the like.

The ultrasonic tactile feedback generator may emit an ultrasonic energy beam, to cause the ultrasonic energy beam to strike a skin of a person, so that the person feels tactile feedback.

For example, in some embodiments, to allow the user to feel tactile feedback in addition to visual changes, so as to achieve multi-dimensional interactive feedback experience, the motion sensing feedback may include tactile feedback, the motion sensing feedback information may include an ultrasonic signal, and step (1) of determining motion sensing feedback information corresponding to the motion sensing operation may include the following steps:

generating the ultrasonic signal based on the motion sensing operation.

Therefore, step (2) of transmitting the motion sensing feedback information to the second region of the space, so that the user receives the motion sensing feedback information in the second region of the space may include the following steps:

transmitting the ultrasonic signal to the second region of the space, so that the user feels the tactile feedback formed by the ultrasonic signal in the second region of the space.

Step 104. Transmit an optical signal of the updated three-dimensional virtual object to the first region of the space, so that an image of the updated three-dimensional virtual object is generated in the second region of the space, to implement interaction between the user and the three-dimensional virtual object.

In some embodiments, step 104 may include the following steps:

(1) performing a mirror flipping operation on the updated three-dimensional virtual object, to obtain a flipped updated three-dimensional virtual object; and (2) generating an optical signal of the flipped updated three-dimensional virtual object, and transmitting the optical signal of the flipped updated three-dimensional virtual object to the first region of the space, an optical panel being disposed in the first region of the space, so that the updated three-dimensional virtual object is displayed in the second region of the space after the optical signal of the flipped updated three-dimensional virtual object is negatively refracted by the optical panel.

In some embodiments, the optical signal may include a left optical signal and a right optical signal, and step (2) of generating an optical signal of the flipped updated three-dimensional virtual object, and transmitting the optical signal of the flipped updated three-dimensional virtual object to the first region of the space may include the following steps:

generating the left optical signal and the right optical signal of the flipped updated three-dimensional virtual object; and transmitting the left optical signal and the right optical signal to the first region of the space, so that the left optical signal enters a right eye of a user after being negatively refracted by the optical panel and the right optical signal enters a left eye of the user after being negatively refracted by the optical panel.

For the step, reference may be made to step 102, and details are not described herein again.

It can be learned from the above that in this embodiment of this application, a three-dimensional virtual object may be obtained; an optical signal of the three-dimensional virtual object is transmitted to a first region of a space, so that an image of the three-dimensional virtual object is generated in a second region of the space; when it is detected that a user performs a motion sensing operation on the image of the three-dimensional virtual object in the second region of the space, the three-dimensional virtual object is updated based on the motion sensing operation, to obtain an updated three-dimensional virtual object; and an optical signal of the updated three-dimensional virtual object is transmitted to the first region of the space, so that an image of the updated three-dimensional virtual object is generated in the second region of the space, to implement interaction between the user and the three-dimensional virtual object.

Therefore, this solution provides a manner of displaying a three-dimensional virtual object in a sensing region in the air. Because a physical limitation of only relying on a screen surface as a display boundary is eliminated, a user can perform motion sensing interaction with the three-dimensional virtual object in a sensing region, where the sensing region may be configured with various combinations of sensing sensors and feedback generators, including but not limited to, an infrared sensor, a time of flight (TOF) sensor, a binocular camera sensor, an ultrasonic sensor, and the like, and also including, but not limited to, an ultrasonic feedback generator, an electromagnetic feedback generator, and the like, thereby improving user experience and implementing a more convenient and more dimensional manner to interact with a displayed image. Therefore, the interaction method provided in this solution enables the user to perform motion sensing interaction with a 3D image projected in the air.

According to the method described in the foregoing embodiments, the following further provides a detailed description.

In this embodiment, the method in this embodiment of this application is described in detail by using an example in which this application is applicable to the game field and is applicable to a display device shown in FIG. 2A.

Figure 2B:
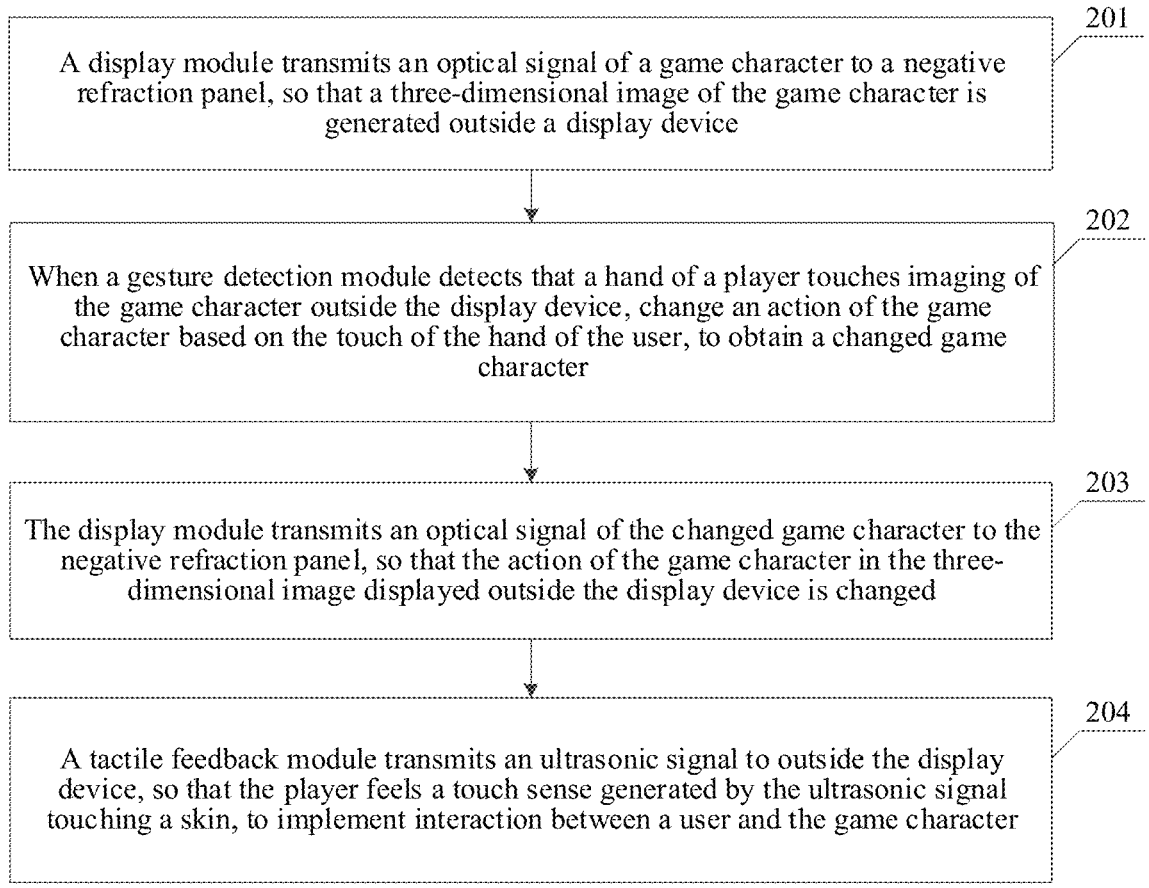
FIG. 2B is a schematic flowchart of an application scenario of an interaction method according to an embodiment of this application.

As shown in FIG. 2B, a specific process of an interaction method is as follows.

201. A display module transmits an optical signal of a game character to a negative refraction panel, so that a three-dimensional virtual object of the game character is generated outside a display device.

For a specific display method, reference may be made to step 102. Details are not described herein.

202. When a gesture detection module detects that a hand of a player touches imaging of the game character outside the display device, change an action of the game character based on the touch of the hand of the player, to obtain a changed game character.

The gesture detection module may adopt, but not limited to, an existing infrared gesture detection solution, an ultrasonic gesture detection solution, or the like.

The gesture detection module determines a corresponding interaction operation by detecting a movement track and a gesture state of a hand of a user in a sensing region, so that an action of a game character is correspondingly changed according to the interaction operation.

In some embodiments, a negative refraction panel may be obliquely placed relative to a display module, and an inclination angle of the negative refraction panel may be changed according to an actual requirement, to modify an imaging effect, an imaging position, and the like of imaging of the game character.

In some embodiments, to facilitate a user to adjust an imaging position and an imaging effect of imaging, a mechanical structure of the display device may further include inclination angle adjusting grooves of a plurality of inclination angles of the negative refraction panel. The negative refraction panel is fixed to different inclination angle adjusting grooves, so that the negative refraction panel may be obliquely placed at different inclination angles relative to the display module.

For a specific detection method, reference may be made to step 103. Details are not described herein.

203. The display module transmits an optical signal of the changed game character to the negative refraction panel, so that the action of the game character in the three-dimensional virtual object displayed outside the device is changed.

For example, when a user tries to touch a three-dimensional virtual object of a game character, the game character may generate a corresponding action change, for example, moving, dodging, deforming, disappearing, and other actions.

For a specific display method, reference may be made to step 101. Details are not described herein.

204. A motion sensing feedback module transmits an ultrasonic signal to outside the display device, so that the player feels a touch sense generated by the ultrasonic signal touching a skin, to implement interaction between a user and the game character.

For example, the motion sensing feedback module may include, but not limited to, an ultrasonic energy generator, an infrared energy generator, and the like. For example, an ultrasonic energy beam may be emitted by using the ultrasonic energy generator, so that the ultrasonic energy beam strikes a skin surface of a hand of a user, to cause the user to feel tactile feedback.

For a specific tactile feedback method, reference may be made to step 103. Details are not described herein.

Therefore, in this solution, a display device may display a three-dimensional virtual object of a game character in a sensing region outside the display device, to eliminate a physical limitation of only relying on a screen surface as a display boundary. After a hand of a user enters the sensing region outside the display device, the display device correspondingly adjusts an action of the game character according to a change of the hand of the user, to implement visual interaction. In addition, a tactile feedback generator may also give corresponding tactile perception to the hand of the user, thereby implementing visual and tactile interactive perception.

It can be learned from the above that in this solution, a display module may transmit an optical signal of a game character to a negative refraction panel, so that a three-dimensional virtual object of the game character is generated outside a display device; when a gesture detection module detects that a hand of a player touches imaging of the game character outside the display device, an action of the game character is changed based on the touch of the hand of the user, to obtain a changed game character; the display module transmits an optical signal of the changed game character to the negative refraction panel, so that the action of the game character in the three-dimensional virtual object displayed outside the display device is changed; and a motion sensing feedback module transmit an ultrasonic signal to outside the display device, so that the player feels a touch sense generated by the ultrasonic signal touching a skin, to implement interaction between a user and the game character.

In this application, a user may interact in the second region with a projection of a 3D image originally projected in the first region. Therefore, the interaction method provided in this solution enables the user to perform motion sensing interaction with a 3D image projected in the air.

To better implement the method, an embodiment of this application further provides an interaction apparatus. The interaction apparatus may be specifically integrated in an electronic device. The electronic device may be a device such as a display, a projector, or a terminal.

For example, in this embodiment, by using an example in which the interaction apparatus is integrated in the display, the interaction apparatus in this embodiment of this application is described in detail.

Figure 3:
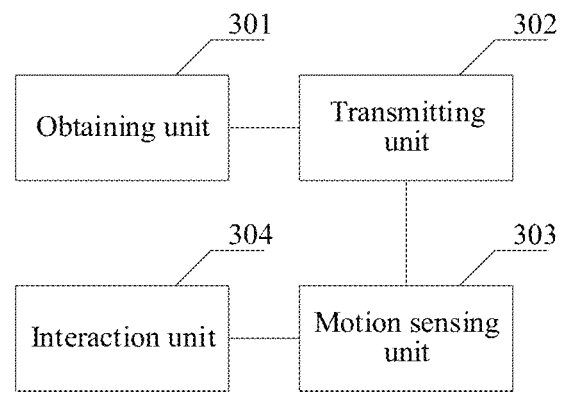
FIG. 3 is a schematic structural diagram of an interaction apparatus according to an embodiment of this application.

For example, as shown in FIG. 3, the interaction apparatus may include an obtaining unit 301, a transmitting unit 302, a motion sensing unit 303, and an interaction unit 304 as follows.

(1) Obtaining unit 301:

the obtaining unit 301 may be configured to obtain a three-dimensional virtual object.

(2) Transmitting unit 302:

the transmitting unit 302 may be configured to transmit an optical signal of the three-dimensional virtual object to a first region of a space, so that an image of the three-dimensional virtual object is generated in a second region of the space.

In some embodiments, the transmitting unit 302 may include a flipping subunit and a transmitting subunit as follows.

(1) Flipping Subunit:

the flipping subunit may be configured to perform a mirror flipping operation on the three-dimensional virtual object, to obtain a flipped three-dimensional virtual object.

(2) Transmitting Subunit:

the transmitting subunit may be configured to generate an optical signal of the flipped three-dimensional virtual object, and transmit the optical signal of the flipped three-dimensional virtual object to the first region of the space, an optical panel being disposed in the first region of the space, so that the three-dimensional virtual object is displayed in the second region of the space after the optical signal is negatively refracted by the optical panel.

In some embodiments, the optical signal may include a left optical signal and a right optical signal, and the transmitting subunit may be configured to:

generate the left optical signal and the right optical signal of the flipped three-dimensional virtual object; and transmit the left optical signal and the right optical signal to the first region of the space, so that the left optical signal enters a right eye of a user after being negatively refracted by the optical panel and the right optical signal enters a left eye of the user after being negatively refracted by the optical panel.

(3) Motion Sensing Unit 303:

the motion sensing unit 303 may be configured to update, when it is detected that a user performs a motion sensing operation on the image of the three-dimensional virtual object in the second region of the space, the three-dimensional virtual object based on the motion sensing operation, to obtain an updated three-dimensional virtual object.

In some embodiments, the motion sensing unit 303 may include an image coordinate subunit, a motion sensing coordinate subunit, a touch status subunit, and an updating subunit as follows.

(1) Image Coordinate Subunit:

the image coordinate subunit may be configured to determine an image coordinate set of the three-dimensional virtual object in a virtual coordinate system.

(2) Motion Sensing Subunit:

the motion sensing subunit may be configured to generate, when the motion sensing operation of the user in the second region of the space is detected, a motion sensing coordinate set of the user in the virtual coordinate system based on the motion sensing operation.

In some embodiments, the motion sensing coordinate set may include a skeleton node coordinate set, and the motion sensing coordinate subunit may be configured to:

obtain a hand image of the user in the second region of the space;

perform skeletal analysis on the hand image, to determine skeleton nodes of a hand of the user; and determine coordinates of the skeleton nodes of the hand of the user in the virtual coordinate system, to obtain the skeleton node coordinate set.

(3) Touch Status Subunit:

the touch status subunit may be configured to determine a touch status of the user for the imaging of the three-dimensional virtual object based on the motion sensing coordinate set of the user and the image coordinate set.

(4) Updating Subunit:

the updating subunit may be configured to update the three-dimensional virtual object based on the touch status, to obtain the updated three-dimensional virtual object.

In some embodiments, the motion sensing unit 303 may further include a feedback information subunit and a feedback subunit as follows.

(1) Feedback Information Subunit:

the feedback information subunit may be configured to determine motion sensing feedback information corresponding to the motion sensing operation.

In some embodiments, the motion sensing feedback may include tactile feedback, the feedback information may include an ultrasonic signal, and the feedback information subunit may be configured to:

generate the ultrasonic signal based on the motion sensing operation.

(2) Feedback Subunit:

the feedback subunit may be configured to transmit the motion sensing feedback information to the second region of the space, so that the user receives the motion sensing feedback information in the second region of the space.

In some embodiments, the feedback subunit may be configured to:

transmit the ultrasonic signal to the second region of the space, so that the user feels the tactile feedback formed by the ultrasonic signal in the second region of the space.

(4) Interaction Unit 304:

the interaction unit 304 may be configured to transmit an optical signal of the updated three-dimensional virtual object to the first region of the space, so that an image of the updated three-dimensional virtual object is generated in the second region of the space, to implement interaction between the user and the three-dimensional virtual object.

In some embodiments, the interaction unit 304 may include an update flipping subunit and an update transmitting subunit as follows.

(1) Update Flipping Subunit:

the update flipping subunit may be configured to perform a mirror flipping operation on the updated three-dimensional virtual object, to obtain a flipped updated three-dimensional virtual object.

(2) Update Transmitting Subunit:

the update transmitting subunit may be configured to generate an optical signal of the flipped updated three-dimensional virtual object, and transmit the optical signal of the flipped updated three-dimensional virtual object to the first region of the space, an optical panel being disposed in the first region of the space, so that the updated three-dimensional virtual object is displayed in the second region of the space after the optical signal of the flipped updated three-dimensional virtual object is negatively refracted by the optical panel.

In some embodiments, the optical signal may include a left optical signal and a right optical signal, and the update transmitting subunit may be configured to:

generate the left optical signal and the right optical signal of the flipped updated three-dimensional virtual object; and transmit the left optical signal and the right optical signal to the first region of the space, so that the left optical signal enters a right eye of a user after being negatively refracted by the optical panel and the right optical signal enters a left eye of the user after being negatively refracted by the optical panel.

During specific implementations, the foregoing units may be implemented as independent entities, or may be randomly combined, or may be implemented as the same entity or several entities. For specific implementations of the foregoing units, refer to the foregoing method embodiments. Details are not described herein again.

It can be learned from the above that according to the interaction apparatus in this embodiment, an obtaining unit obtains a three-dimensional virtual object; a transmitting unit transmits an optical signal of the three-dimensional virtual object to a first region of a space, so that an image of the three-dimensional virtual object is generated in a second region of the space; a motion sensing unit updates, when it is detected that a user performs a motion sensing operation on the image of the three-dimensional virtual object in the second region of the space, the three-dimensional virtual object based on the motion sensing operation, to obtain an updated three-dimensional virtual object; and an interaction unit transmits an optical signal of the updated three-dimensional virtual object to the first region of the space, so that an image of the updated three-dimensional virtual object is generated in the second region of the space, to implement interaction between the user and the three-dimensional virtual object.

Therefore, in this embodiment of this application, a user may perform motion sensing interaction with a 3D image projected in the air.

An embodiment of this application further provides an electronic device. The electronic device may be a display device such as a display, a projector, or a display terminal.

Figure 4:
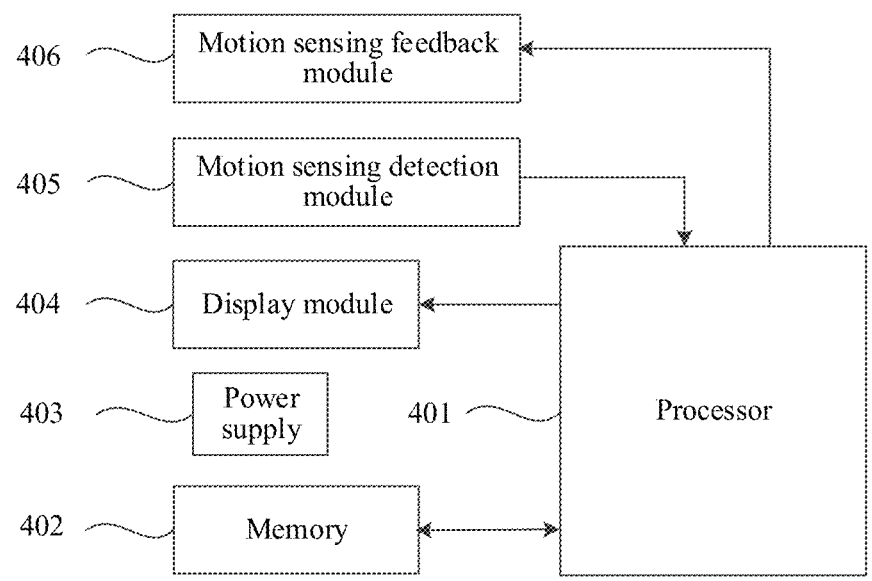
FIG. 4 is a schematic structural diagram of a display device according to an embodiment of this application.

In this embodiment, a detailed description is made by using an example in which the electronic device of this embodiment is the display device. For example, FIG. 4 is a schematic structural diagram of a display device according to an embodiment of this application. Specifically:

The display device may include components such as a processor 401 with one or more processing cores, a memory 402 with one or more computer-readable storage media, a power supply 403, a display module 404, a motion sensing detection module 405, and a motion sensing feedback module 406. In addition, the display device may further include an optical panel. The optical panel may not be electrically connected to each part of the entire display device. The optical panel may be a panel component including a negative refraction panel. The negative refraction panel is a panel made of a negative refraction material.

A dielectric constant or a permeability of the negative refraction material is negative and has a negative refraction.

A person skilled in the art may understand that the structure of the display device shown in FIG. 4 does not constitute a limitation to the display device, and the display device may include more components or fewer components than those shown in the figure, or some components may be combined, or a different component deployment may be used.

The processor 401 is a control center of the display device, and is connected to various parts of the entire display device by using various interfaces and lines. By running or executing the software program and/or module stored in the memory 402, and invoking data stored in the memory 402, the processor performs various functions and data processing of the device, thereby performing overall monitoring on the display device. In some embodiments, the processor 401 may include one or more processing cores. In some embodiments, the processor 401 may integrate an application processor and a modem. The application processor mainly processes an operating system, a user interface, an application program, and the like. The modem mainly processes wireless communication. It may be understood that the foregoing modem may either not be integrated into the processor 401.

The memory 402 may be configured to store a software program and a module, and the processor 401 runs the software program and the module that are stored in the memory 402, to implement various functional applications and data processing. The memory 402 may mainly include a program storage area and a data storage area. The program storage area may store an operating system, an application program required by at least one function (for example, a sound playback function and an image playback function), or the like. The data storage area may store data created according to use of the display device. In addition, the memory 402 may include a high speed random access memory, and may also include a non-volatile memory, such as at least one magnetic disk storage device, a flash memory, or another volatile solid-state storage device. Correspondingly, the memory 402 may further include a memory controller, to provide access of the processor 401 to the memory 402.

The display device further includes the power supply 403 supplying power to various components. In some embodiments, the power supply 403 may be logically connected to the processor 401 by using a power management system, thereby implementing functions such as charging, discharging, and power consumption management by using the power management system. The power supply 403 may further include one or more of a direct current or alternating current power supply, a re-charging system, a power failure detection circuit, a power supply converter or inverter, a power supply state indicator, and any other component.

The display device may further include the display module 404. The display module 404 may be configured to transmit an optical signal and the like. In some embodiments, the display module 404 may include a light-field display screen, a polarized display screen, and the like.

The display device may further include the motion sensing detection module 405. The motion sensing detection module 405 may be configured to detect a motion sensing operation of a user. The motion sensing detection module 405 may include an infrared sensor, an ultrasonic sensor, an image sensor, a depth sensor, and the like.

The display device may further include the motion sensing feedback module 406. The motion sensing feedback module 406 is configured to transmit motion sensing feedback information. The motion sensing feedback information may include ultrasonic information, infrared information, and the like.

Although not shown in the figure, the display device may further include a sound unit, and the like. Details are not described herein again.

Specifically, in this embodiment, the processor 401 in the display device may load executable files corresponding to processes of one or more application programs to the memory 402 according to the following instructions, and the processor 401 runs the application program stored in the memory 402, to implement various functions as follows:

obtaining a three-dimensional virtual object;

transmitting an optical signal of the three-dimensional virtual object to a first region of a space, so that an image of the three-dimensional virtual object is generated in a second region of the space;

updating, when it is detected that a user performs a motion sensing operation on the image of the three-dimensional virtual object in the second region of the space, the three-dimensional virtual object based on the motion sensing operation, to obtain an updated three-dimensional virtual object; and transmitting an optical signal of the updated three-dimensional virtual object to the first region of the space, so that an image of the updated three-dimensional virtual object is generated in the second region of the space, to implement interaction between the user and the three-dimensional virtual object.

In some embodiments, the processor 401 is further configured to perform the following steps:

determining motion sensing feedback information corresponding to the motion sensing operation; and controlling the motion sensing feedback module 406 to transmit the motion sensing feedback information to the second region of the space, so that the user receives the motion sensing feedback information in the second region of the space.

In some embodiments, the motion sensing feedback includes tactile feedback, the motion sensing feedback information includes an ultrasonic signal, and before the step of determining motion sensing feedback information corresponding to the motion sensing operation is performed, the processor 401 is configured to perform the following steps:

generating the ultrasonic signal based on the motion sensing operation.

when the step of controlling the display module 404 to transmit the motion sensing feedback information to the second region of the space, so that the user receives the motion sensing feedback information in the second region of the space is performed, the processor 401 is configured to perform the following steps:

controlling the display module 404 to transmit the ultrasonic signal to the second region of the space, so that the user feels the tactile feedback formed by the ultrasonic signal in the second region of the space.

In some embodiments, when the step of controlling the display module 404 to transmit an optical signal of the three-dimensional virtual object to the first region of the space, so that an image of the three-dimensional virtual object is generated in the second region of the space is performed, the processor 401 is configured to perform the following steps:

performing a mirror flipping operation on the three-dimensional virtual object, to obtain a flipped three-dimensional virtual object; and controlling the display module 404 to generate an optical signal of the flipped three-dimensional virtual object, and transmitting the optical signal of the flipped three-dimensional virtual object to the first region of the space, so that the three-dimensional virtual object is displayed in the second region of the space after the optical signal is negatively refracted by the optical panel.

In some embodiments, the optical signal includes a left optical signal and a right optical signal, and when the step of controlling the display module 404 to generate an optical signal of the flipped three-dimensional virtual object, and transmitting the optical signal of the flipped three-dimensional virtual object to the first region of the space is performed, the processor 401 is configured to perform the following steps:

generating the left optical signal and the right optical signal of the flipped three-dimensional virtual object; and transmitting the left optical signal and the right optical signal to the first region of the space, so that the left optical signal enters a right eye of the user after being negatively refracted by the optical panel and the right optical signal enters a left eye of the user after being negatively refracted by the optical panel.

In some embodiments, when the step of transmitting the optical signal of the updated three-dimensional virtual object to the first region of the space, so that an image of the updated three-dimensional virtual object is generated in the second region of the space is performed, the processor 401 is configured to perform the following steps:

performing a mirror flipping operation on the updated three-dimensional virtual object, to obtain a flipped updated three-dimensional virtual object; and controlling the display module 404 to generate an optical signal of the flipped updated three-dimensional virtual object, and transmitting the optical signal of the flipped updated three-dimensional virtual object to the first region of the space, an optical panel being disposed in the first region of the space, so that the updated three-dimensional virtual object is displayed in the second region of the space after the optical signal of the flipped updated three-dimensional virtual object is negatively refracted by the optical panel.

In some embodiments, the optical signal includes a left optical signal and a right optical signal, and when the step of controlling the display module 404 to generate an optical signal of the flipped updated three-dimensional virtual object and transmitting the optical signal of the flipped updated three-dimensional virtual object to the first region of the space is performed, the processor 401 is configured to perform the following steps:

controlling the display module 404 to generate the left optical signal and the right optical signal of the flipped updated three-dimensional virtual object; and transmitting the left optical signal and the right optical signal to the first region of the space, so that the left optical signal enters a right eye of a user after being negatively refracted by the optical panel and the right optical signal enters a left eye of the user after being negatively refracted by the optical panel.

In some embodiments, when the step of updating, when it is detected that a user performs a motion sensing operation on the image of the three-dimensional virtual object in the second region of the space, the three-dimensional virtual object based on the motion sensing operation, to obtain an updated three-dimensional virtual object is performed, the processor 401 is configured to perform the following steps:

determining an image coordinate set of the three-dimensional virtual object in a virtual coordinate system;

generating, when the motion sensing detection module 405 detects the motion sensing operation of the user in the second region of the space, a motion sensing coordinate set of the user in the virtual coordinate system based on the motion sensing operation;

determining a touch status of the user for the imaging of the three-dimensional virtual object based on the motion sensing coordinate set of the user and the image coordinate set; and updating the three-dimensional virtual object based on the touch status, to obtain the updated three-dimensional virtual object.

In some embodiments, the motion sensing coordinate set includes a skeleton node coordinate set, and when the step of generating, when the motion sensing detection module 405 detects the motion sensing operation of the user in the second region of the space, a motion sensing coordinate set of the user in the virtual coordinate system based on the motion sensing operation is performed, the motion sensing detection module 405 is configured to perform the following steps:

obtaining a hand image of the user in the second region of the space;

performing skeletal analysis on the hand image, to determine skeleton nodes of a hand of the user; and determining coordinates of the skeleton nodes of the hand of the user in the virtual coordinate system, to obtain a skeleton node coordinate set.

For specific implementations of the above operations, reference may be made to the foregoing embodiments. Details are not described herein again.

It can be learned from the above that according to the interaction method provided in this solution, a user may perform motion sensing interaction with a 3D image in the air.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Accordingly, an embodiment of this application provides a computer-readable storage medium, storing a plurality of instructions. The instructions can be loaded by a processor, to perform the steps in the interaction method according to the embodiments of this application. For example, the instructions may perform the following steps:

obtaining a three-dimensional virtual object;

transmitting an optical signal of the three-dimensional virtual object to a first region of a space, so that an image of the three-dimensional virtual object is generated in a second region of the space;

updating, when it is detected that a user performs a motion sensing operation on the image of the three-dimensional virtual object in the second region of the space, the three-dimensional virtual object based on the motion sensing operation, to obtain an updated three-dimensional virtual object; and transmitting an optical signal of the updated three-dimensional virtual object to the first region of the space, so that an image of the updated three-dimensional virtual object is generated in the second region of the space, to implement interaction between the user and the three-dimensional virtual object.

According to an aspect of this application, a computer program product is provided, the computer program product or a computer program including computer instructions, the computer instructions being stored in a computer-readable storage medium. A processor of a computer device reads the computer instructions from the computer-readable storage medium, and executes the computer instructions, so that the computer device performs the method provided in the foregoing embodiments in a three-dimensional virtual object display aspect or a three-dimensional virtual object interaction aspect.

The storage medium may include a read-only memory (ROM), a random access memory (RAM), a magnetic disk, an optical disc, or the like.

Because the instructions stored in the storage medium may perform the steps of any interaction method provided in the embodiments of this application, the instructions can implement beneficial effects that may be implemented by any interaction method provided in the embodiments of this application. For details, reference may be made to the foregoing embodiments. Details are not described herein again.

The interaction method and apparatus, the display device, and the computer-readable storage medium provided in the embodiments of this application are described in detail above. The principles and implementations of this application are described through specific examples in this specification, and the descriptions of the embodiments are only intended to help understand the methods and core ideas of this application. In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. Meanwhile, a person of ordinary skill in the art may make modifications to the specific implementations and application scopes according to the ideas of the present disclosure. In conclusion, the content of the specification is not to be construed as a limitation to the present disclosure.

What is claimed is:

1. A method performed by a display device, the method comprising:

obtaining a three-dimensional virtual object; and transmitting an optical signal of the three-dimensional virtual object to a first region of a three-dimensional space and projecting the optical signal of the three-dimensional virtual object from the first region into a second region of the space through the display device including an optical panel being disposed at a junction between the first region and the second region of the space, so that a three-dimensional image of the three-dimensional virtual object is generated in the second region of the space that is outside the display device after the optical signal is negatively refracted by the optical panel.

2. The method according to claim 1, the method comprising:

when it is detected that a user performs a motion sensing operation on the image of the three-dimensional virtual object in the second region of the space, updating the three-dimensional virtual object based on the motion sensing operation, to obtain an updated three-dimensional virtual object; and transmitting an optical signal of the updated three-dimensional virtual object to the first region of the space and projecting the optical signal of the updated three-dimensional virtual object from the first region into the second region of the space through the display device, so that an image of the updated three-dimensional virtual object is generated in the second region of the space.

3. The method according to claim 2, wherein the transmitting an optical signal of the updated three-dimensional virtual object to the first region of the space and projecting the optical signal of the updated three-dimensional virtual object from the first region into the second region of the space through the display device comprises:

performing a mirror flipping operation on the updated three-dimensional virtual object, to obtain a flipped updated three-dimensional virtual object; and generating an optical signal of the flipped updated three-dimensional virtual object, and transmitting the optical signal of the flipped updated three-dimensional virtual object to the first region of the space, the display device including an optical panel being disposed at a junction between the first region and the second region of the space, so that the updated three-dimensional virtual object is displayed in the second region of the space after the optical signal of the flipped updated three-dimensional virtual object is negatively refracted by the optical panel.

4. The method according to claim 3, wherein the optical signal comprises a left optical signal and a right optical signal, and the generating an optical signal of the flipped updated three-dimensional virtual object, and transmitting the optical signal of the flipped updated three-dimensional virtual object to the first region of the space comprises:

generating the left optical signal and the right optical signal of the flipped updated three-dimensional virtual object; and transmitting the left optical signal and the right optical signal to the first region of the space, so that the left optical signal enters a right eye of the user after being negatively refracted by the optical panel and the right optical signal enters a left eye of the user after being negatively refracted by the optical panel.

5. The method according to claim 2, wherein the updating the three-dimensional virtual object based on the motion sensing operation, to obtain an updated three-dimensional virtual object comprises:

determining an image coordinate set of the three-dimensional virtual object in a virtual coordinate system;

generating, when the motion sensing operation of the user in the second region of the space is detected, a motion sensing coordinate set of the user in the virtual coordinate system based on the motion sensing operation;

determining a touch status of the user for the imaging of the three-dimensional virtual object based on the motion sensing coordinate set of the user and the image coordinate set; and updating the three-dimensional virtual object based on the touch status, to obtain the updated three-dimensional virtual object.

6. The method according to claim 5, wherein the motion sensing coordinate set comprises a skeleton node coordinate set, and the generating, when the motion sensing operation of the user in the second region of the space is detected, a motion sensing coordinate set of the user in the virtual coordinate system based on the motion sensing operation comprises:

obtaining a hand image of the user in the second region of the space;

performing skeletal analysis on the hand image, to determine skeleton nodes of a hand of the user; and determining coordinates of the skeleton nodes of the hand of the user in the virtual coordinate system, to obtain the skeleton node coordinate set.

7. The method according to claim 2, wherein the updating the three-dimensional virtual object based on the motion sensing operation, to obtain an updated three-dimensional virtual object further comprises:

determining motion sensing feedback information corresponding to the motion sensing operation; and transmitting the motion sensing feedback information to the second region of the space, so that the user receives the motion sensing feedback information in the second region of the space.

8. The method according to claim 7, wherein the motion sensing feedback comprises tactile feedback, the motion sensing feedback information comprises an ultrasonic signal, and the determining motion sensing feedback information corresponding to the motion sensing operation comprises:

generating the ultrasonic signal based on the motion sensing operation; and the transmitting the motion sensing feedback information to the second region of the space, so that the user receives the motion sensing feedback information in the second region of the space comprises:

transmitting the ultrasonic signal to the second region of the space, so that the user feels the tactile feedback formed by the ultrasonic signal in the second region of the space.

9. The method according to claim 1, wherein the transmitting an optical signal of the three-dimensional virtual object to a first region of a three-dimensional space and projecting the optical signal of the three-dimensional virtual object from the first region into a second region of the space through the display device comprises:

performing a mirror flipping operation on the three-dimensional virtual object, to obtain a flipped three-dimensional virtual object; and generating an optical signal of the flipped three-dimensional virtual object, and transmitting the optical signal of the flipped three-dimensional virtual object to the first region of the space.

10. The method according to claim 9, wherein the optical signal comprises a left optical signal and a right optical signal, and the generating an optical signal of the flipped three-dimensional virtual object, and transmitting the optical signal of the flipped three-dimensional virtual object to the first region of the space comprises:

generating the left optical signal and the right optical signal of the flipped three-dimensional virtual object; and transmitting the left optical signal and the right optical signal to the first region of the space, so that the left optical signal enters a right eye of the user after being negatively refracted by the optical panel and the right optical signal enters a left eye of the user after being negatively refracted by the optical panel.

11. A display device, comprising: a display module, an optical panel, a motion sensing detection module, a memory, and a processor, the motion sensing detection module being configured to detect a motion sensing operation of a user;

the display module being configured to transmit an optical signal;

the optical panel being disposed at a junction between a first region of a three-dimensional space and a second region of the three-dimensional space and being configured to negatively refract an optical signal of a three-dimensional virtual object transmitted to the first region of the space, so that an image of the three-dimensional virtual object is generated in the second region of the space by using the optical signal and the second region of the space being outside the display device;

the memory being configured to store data of the three-dimensional virtual object and a plurality of instructions; and the processor being configured to read the plurality of instructions stored in the memory to perform the following operations:

obtaining a three-dimensional virtual object; and transmitting an optical signal of the three-dimensional virtual object to a first region of a three-dimensional space and projecting the optical signal of the three-dimensional virtual object from the first region into a second region of the space through the display device including an optical panel being disposed at a junction between the first region and the second region of the space, so that a three-dimensional image of the three-dimensional virtual object is generated in the second region of the space that is outside the display device after the optical signal is negatively refracted by the optical panel.

12. The display device according to claim 11, wherein the processor is further configured to perform the following operations:

when the motion sensing detection module detects that the user performs a motion sensing operation on the image of the three-dimensional virtual object in the second region of the space, updating the three-dimensional virtual object based on the motion sensing operation, to obtain an updated three-dimensional virtual object; and transmitting an optical signal of the updated three-dimensional virtual object to the first region of the space and projecting the optical signal of the updated three-dimensional virtual object from the first region into the second region of the space through the display device, so that an image of the updated three-dimensional virtual object is generated in the second region of the space.

13. The display device according to claim 12, wherein the updating the three-dimensional virtual object based on the motion sensing operation, to obtain an updated three-dimensional virtual object further comprises:

determining motion sensing feedback information corresponding to the motion sensing operation; and transmitting the motion sensing feedback information to the second region of the space, so that the user receives the motion sensing feedback information in the second region of the space.

14. The display device according to claim 13, wherein the motion sensing feedback comprises tactile feedback, the motion sensing feedback information comprises an ultrasonic signal, and the determining motion sensing feedback information corresponding to the motion sensing operation comprises:

generating the ultrasonic signal based on the motion sensing operation; and the transmitting the motion sensing feedback information to the second region of the space, so that the user receives the motion sensing feedback information in the second region of the space comprises:

transmitting the ultrasonic signal to the second region of the space, so that the user feels the tactile feedback formed by the ultrasonic signal in the second region of the space.

15. The display device according to claim 11, wherein the transmitting an optical signal of the three-dimensional virtual object to a first region of a three-dimensional space and projecting the optical signal of the three-dimensional virtual object from the first region into a second region of the space through the display device comprises:

performing a mirror flipping operation on the three-dimensional virtual object, to obtain a flipped three-dimensional virtual object; and generating an optical signal of the flipped three-dimensional virtual object, and transmitting the optical signal of the flipped three-dimensional virtual object to the first region of the space.

16. The display device according to claim 15, wherein the optical signal comprises a left optical signal and a right optical signal, and the generating an optical signal of the flipped three-dimensional virtual object, and transmitting the optical signal of the flipped three-dimensional virtual object to the first region of the space comprises:

generating the left optical signal and the right optical signal of the flipped three-dimensional virtual object; and transmitting the left optical signal and the right optical signal to the first region of the space, so that the left optical signal enters a right eye of the user after being negatively refracted by the optical panel and the right optical signal enters a left eye of the user after being negatively refracted by the optical panel.

17. The display device according to claim 15, wherein the updating the three-dimensional virtual object based on the motion sensing operation, to obtain an updated three-dimensional virtual object comprises:

determining an image coordinate set of the three-dimensional virtual object in a virtual coordinate system;

when the motion sensing operation of the user in the second region of the space is detected by the motion sensing detection module, generating a motion sensing coordinate set of the user in the virtual coordinate system based on the motion sensing operation;

determining a touch status of the user for the imaging of the three-dimensional virtual object based on the motion sensing coordinate set of the user and the image coordinate set; and updating the three-dimensional virtual object based on the touch status, to obtain the updated three-dimensional virtual object.

18. The display device according to claim 17, wherein the motion sensing coordinate set comprises a skeleton node coordinate set, and the generating, when the motion sensing operation of the user in the second region of the space is detected, a motion sensing coordinate set of the user in the virtual coordinate system based on the motion sensing operation comprises:

obtaining a hand image of the user in the second region of the space;

performing skeletal analysis on the hand image, to determine skeleton nodes of a hand of the user; and determining coordinates of the skeleton nodes of the hand of the user in the virtual coordinate system, to obtain the skeleton node coordinate set.

19. A non-transitory computer-readable storage medium, storing a plurality of instructions, the instructions, when executed by a processor of a display device, causing the display device to perform a method including:

obtaining a three-dimensional virtual object; and transmitting an optical signal of the three-dimensional virtual object to a first region of a three-dimensional space and projecting the optical signal of the three-dimensional virtual object from the first region into a second region of the space through the display device including an optical panel being disposed at a junction between the first region and the second region of the space, so that a three-dimensional image of the three-dimensional virtual object is generated in the second region of the space that is outside the display device after the optical signal is negatively refracted by the optical panel.

20. The non-transitory computer-readable storage medium according to claim 19, wherein the method further includes:

when the motion sensing detection module detects that the user performs a motion sensing operation on the image of the three-dimensional virtual object in the second region of the space, updating the three-dimensional virtual object based on the motion sensing operation, to obtain an updated three-dimensional virtual object; and transmitting an optical signal of the updated three-dimensional virtual object to the first region of the space and projecting the optical signal of the updated three-dimensional virtual object from the first region into the second region of the space through the display device, so that an image of the updated three-dimensional virtual object is generated in the second region of the space.

* * * * *